United States Patent [19]
Lindberg

[11] 3,804,610
[45] Apr. 16, 1974

[54] APPARATUS FOR PRESS BENDING GLASS SHEETS

[75] Inventor: Leo H. Lindberg, Whitby, Ontario, Canada

[73] Assignee: PPG Industries, Inc., Pittsburgh, Pa.

[22] Filed: June 7, 1972

[21] Appl. No.: 260,442

[30] Foreign Application Priority Data
Nov. 2, 1971   Canada .............................. 126675

[52] U.S. Cl. .................................. 65/273, 65/275
[51] Int. Cl. ............................................. C03b 23/02
[58] Field of Search .................... 65/106, 273, 275

[56] References Cited
UNITED STATES PATENTS

| | | | |
|---|---|---|---|
| 3,459,521 | 8/1969 | Nedelec | 65/106 X |
| 3,389,984 | 6/1968 | Englehart et al. | 65/106 X |
| 2,239,546 | 4/1941 | Black et al. | 65/106 |

*Primary Examiner*—Arthur D. Kellogg
*Attorney, Agent, or Firm*—Cushman, Darby & Cushman

[57] ABSTRACT

A press bending block having a convexly curved shaping surface is provided with a flexible heat resistant cover and means for causing portions of said cover to urge a shaped sheet of glass away from said shaping surface at the end of a bending operation whereby to reduce any tendency of the shaped sheet to cling to said surface. Provision is also made to limit the glass shaping pressure to reduce any tendency for the glass surface to become imprinted by virtue of its contact with the heat resistant cover.

8 Claims, 6 Drawing Figures

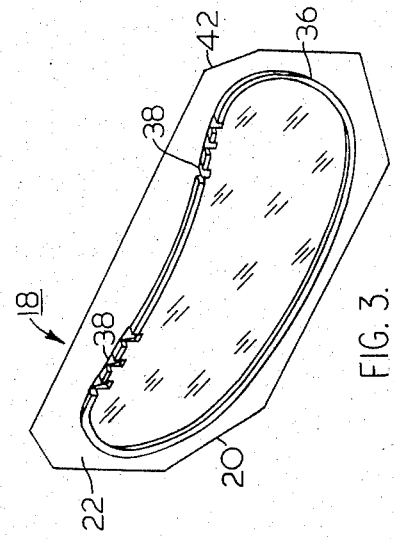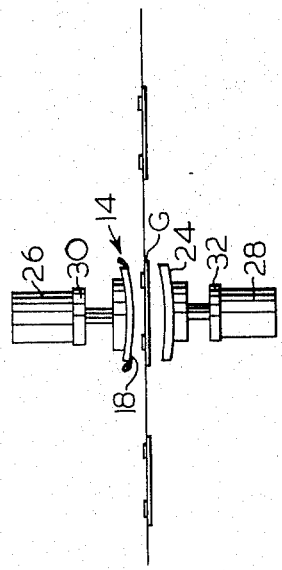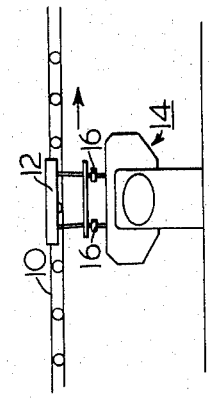

3,804,610

APPARATUS FOR PRESS BENDING GLASS SHEETS

BACKGROUND OF THE INVENTION

The present invention relates generally to improvements in methods and apparatus for shaping glass sheets wherein the heat softened glass sheet is supported in spaced relation between two glass shaping members having complementary convex and concave shaping surfaces with the glass being shaped by being sandwiched in pressurized contact between said shaping members while still in a heat softened condition.

The above mentioned operation is commonly known in the art as "press bending". The glass sheets are usually shaped successively in a mass production operation which involves conveying the sheets in succession through a heating furnace and outwardly thereof to a press bending station where the hot sheets are individually shaped by engaging them between the shaping surfaces of the shaping members, the latter being commonly termed press bending blocks. The shaped sheets are then conveyed to a quenching or cooling station.

The shaping surfaces of the press bending blocks are usually covered with a layer of flexible heat resistant fabric, e.g., fiberglass cloth, to prevent direct contact between the shaping surfaces and the glass whereby to reduce the risk of marring or scratching the glass surfaces.

One problem often encountered is that the heated glass sheets, after being shaped by virtue of being engaged between the pressurized surfaces, have a tendency to cling to one of the latter, particularly to the convexly curved shaping surface. The reason for this appears to be that a vacuum effect is set up between the shaping surface and the closely conforming hot glass sheet. This problem is especially noticeable in high speed operations and when severe enough can cause glass distortion and breakage resulting from the additional stresses applied thereto by the tong supports used to support and convey the sheets throughout the course of the bending operation.

BRIEF SUMMARY OF THE INVENTION

Accordingly, one object of the present invention is to provide apparatus for reducing the tendency of the hot glass sheets to cling to the press block shaping surface.

Accordingly the invention in one aspect provides apparatus for press bending heat softened glass sheets comprising a pair of press bending blocks defining complementary concave and convex shaping surfaces of predetermined contour conforming to the shape desired for the glass sheet after bending. Means are provided to bring the press bending blocks into pressurized contact with opposing major surfaces of the heat softened sheet supported therebetween whereby to shape the latter. The shaping surfaces have flexible heat resistant coverings thereon to assist in preventing damage to the glass surfaces by preventing direct contact of the glass with the press bending blocks. The invention is particularly characterized by the provision of means, associated with one of the press bending blocks, for causing a portion of the flexible cover thereon to resiliently urge glass in contact with same away from said shaping surface after the glass has been released from pressurized contact between the press bending blocks whereby to reduce any tendency of the shaped glass to cling to said last mentioned shaping surface.

In accordance with a further aspect of the invention the above mentioned means for causing the flexible cover to urge the glass away from the shaping surface includes a ledge extending along the marginal edges of the shaping surfaces such that the ledge is spaced outwardly of the edges of the shaped glass sheet when the latter is in contact with said shaping surface, and means securing and tensioning the flexible cover such that it extends over the ledge with the latter tending to hold the cover portions adjacent thereto in spaced relation to the shaping surfaces underlying the same.

In the preferred form of the invention the ledge extends a substantial portion of the distance around the shaping surface.

In accordance with a still further feature of the invention the means for causing the flexible cover to urge glass away from the shaping surface is associated with that press block having the convex shaping surface.

A further problem often encountered in the shaping of glass sheets is that, while the covering materials commonly used for the shaping surfaces are quite effective in preventing undue marring or scratching of the glass surfaces, there is a tendency for this cover material itself to leave a slight imprint, corresponding to the pattern of the cloth, on the glass surfaces especially if the shaping pressures are excessive. This imprint is objectionable as it lowers the optical qualities of the glass and, if severe, can render it unsaleable.

A further object of the invention therefore is to provide means for reducing the tendency of the shaping surface cover to imprint the glass surface during the bending operation.

In accordance with this aspect of the invention the above mentioned ledge extending along the marginal edges of the shaping surface also extends above the shaping surfaces a distance which is slightly greater than the glass thickness such that this ledge contacts the other shaping member during the bending operation. This serves to control the gap between the closed press blocks such that this gap between the shaping surfaces is just slightly more than the glass thickness thus limiting the contact pressure between the glass and shaping surfaces and thus reducing the tendency of the flexible cover to imprint the glass.

DESCRIPTION OF THE VIEWS OF DRAWINGS

The invention will be understood more clearly in the light of the following description of a preferred embodiment of same wherein reference is made to drawings in which:

FIG. 1 is a side elevation view of a portion of a continuous line for press bending heated glass sheets;

FIG. 2 is a fragmentary plan view of a press bending line of FIG. 1;

FIG. 3 is a perspective view of a press block incorporating the principles of the present invention;

DETAILED DESCRIPTION

Figure 4:
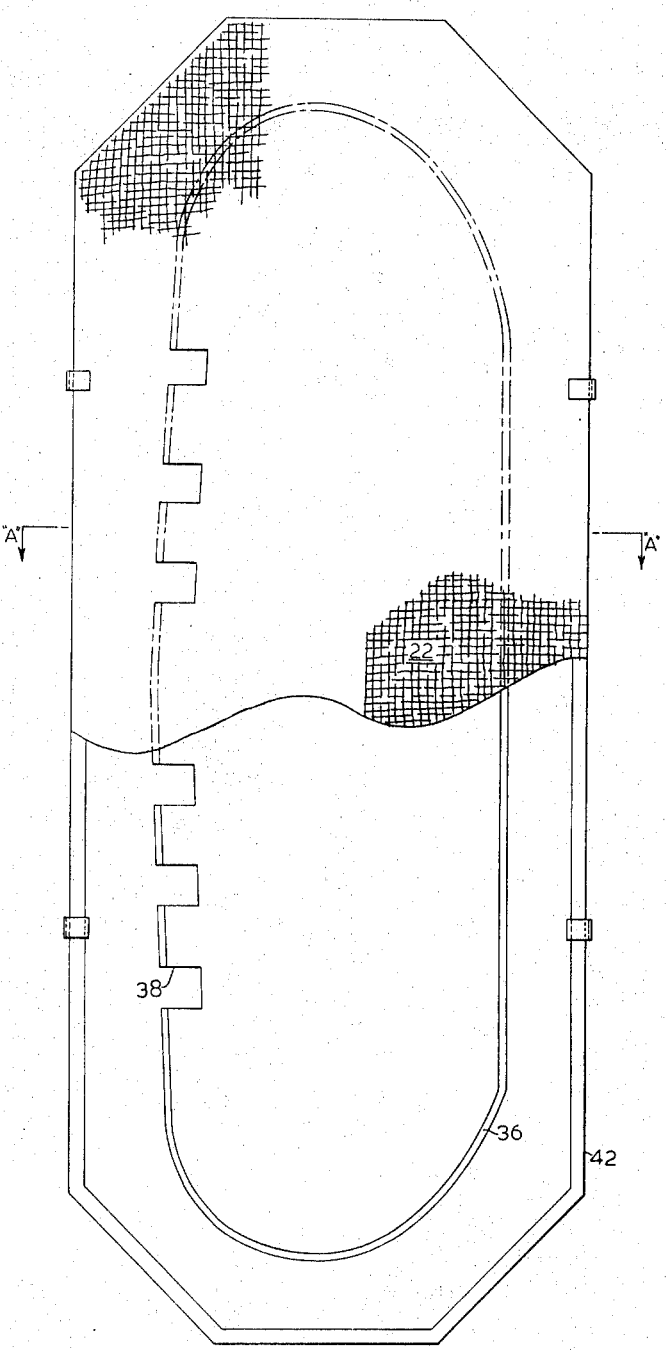
FIG. 4 is a plan view of a press block as illustrated in FIG. 3.

Referring to the drawings at FIGS. 1 and 2, reference numeral 10 refers to a conveyor for moving carriages 12 through a glass heating furnace (not shown), then through a glass shaping station 14, and finally through a glass quenching or cooling station (not shown) in the manner well known in the art. The conveyor continues through an unloading station while a return conveyor is provided for returning unloaded carriages to a loading station. There is no need to show these additional items in the drawings as they are all very well known in the art.

Each of the carriages 12 has a plurality of glass gripping tongs 16 suspended therefrom. Each pair of tongs 16 has a pair of glass gripping elements (not shown) that apply opposing forces through the thickness of a glass sheet G to suspend the glass sheet therefrom in a vertical plane.

Referring to FIGS. 2 and 3, the glass shaping station 14 includes a convex press bending member 18 having a convex shaping surface 20 covered with a fiber glass cloth cover 22. On the other side of the vertical plane occupied by the glass sheet there is provided a concave press bending block 24, the latter having its concave shaping surface also covered with a fiber glass cloth cover. The concave shaping surface of press bending block 24 conforms to and is substantially complementary to the convex shaping surface of press bending block 18.

The press bending blocks 18 and 24 are made in a manner which, except as set forth hereinafter, is well known in the art and are composed of a heat resistant material, several varieties of which are commercially available.

Actuating pistons 26 and 28 are mounted to the rear of the convex and concave press bending blocks 18 and 24 respectively to urge the latter to move along the axes defined by the respective cylinder rods thereof towards and away from the vertical plane occupied by the glass sheets G. The cylinders 26 and 28 are rigidly attached to suitable support structures 30 and 32.

Figure 5:
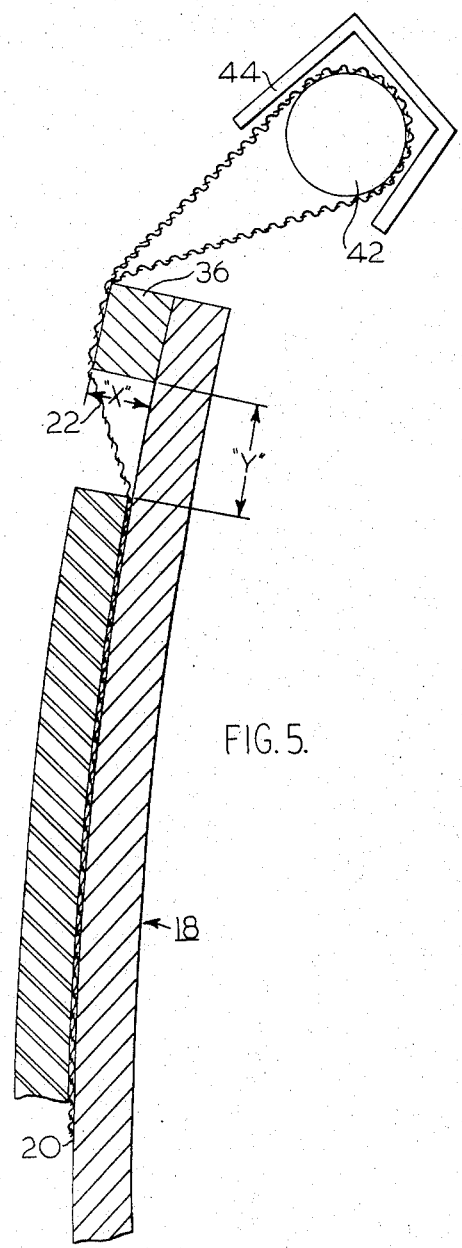
FIGS. 5 and 6 are cross section views of the press bending block taken along section line A—A in FIG. 4 and illustrating the principles of the present invention.

With reference to FIGS. 3–6, it will be seen that the press bending block 18 having convex shaping surface 20 has a marginal outline shaped in accordance with the marginal outline of the glass sheet to be shaped thereby. In accordance with the invention there is provided a ledge 36 extending along the marginal edge of the press block shaping surface in such a manner that the ledge is spaced outwardly of the marginal edges of the shaped glass sheet when the latter is in contact with the shaping surface by a distance Y (as shown in FIG. 5) which is preferably about three-eighths to about five-eighths of an inch measured from the edge of the glass sheet to the inside edge of the ledge. This ledge 36 has a thickness (measured at right angles to the shaping surface portion most closely adjacent thereto and shown as dimension X in FIG. 5) which is from about 0.010 to about 0.030 inch greater than the thickness of the glass sheet being shaped. It will be seen from the drawings that this ledge 36 extends completely around the shaping surface of the convex shaping member and is interrupted only by the several tong notches 38 which provide clearance to receive the glass gripping tongs 16 when the shaping members are in pressurized engagement with opposing surfaces of the glass sheet.

The fiber glass cloth cover is secured and tensioned in such a manner that the marginal edges of same extend over the ledge 36 with those portions of the cloth cover disposed immediately inwardly of the ledge being held in spaced relation to the shaping surface portions underlying same. This spaced relationship is designated by the reference numeral 40 in FIG. 6. The means for holding the cloth cover in this fashion comprises a rigid support frame 42 comprising a plurality of tubular elements welded together so as to define an outline type frame which encompasses the press bending block 18 in spaced relation thereto as best seen in FIG. 4 and is rigidly secured thereto by means of suitable support frame clamps 44. This support frame 42 lies in a plane which is located somewhat behind the face of the convex shaping surface 20 such that when the marginal edges of the cloth cover are brought around the tubular elements of the support frame, such cloth is drawn tightly over the ledge 36 whereby to provide the spacing 40 referred to above.

Figure 6:
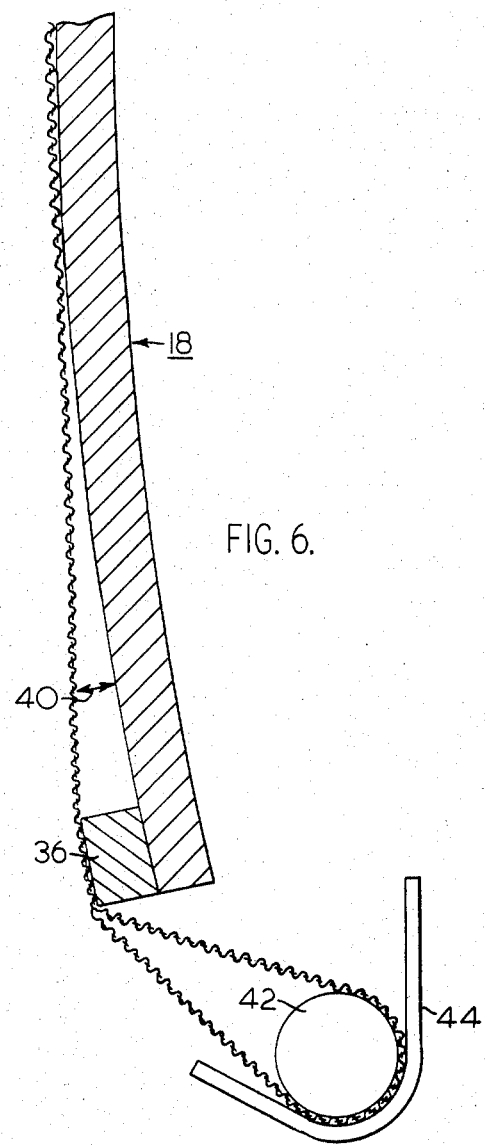

When the glass sheet is being held in pressurized relation between the press bending blocks, the flexible cover 22 lying beneath the formed glass, of course, conforms to the convex face of the press block. By virtue of the spaced relationship between the marginal edge of the glass and the inside edge of ledge 36, excessive flexing of the fiber glass cloth is avoided thus preventing premature failure of same. When the press bending blocks are moved away from one another, the flexible cloth, being under tension, tends to spring back to its original position (as shown in FIG. 6) thus urging the formed glass sheet G away from the convex shaping surface 20. As the flexible cover 22 urges the formed glass away from the convex shaping surface air is allowed to enter between the cover and the press block surface thus substantially eliminating the vacuum effect which previously tended to cause the formed sheet to cling to said surface.

The ledge 36 performs a further important function in that, by virtue of its thickness being slightly greater than the glass thickness, it exerts a controlling influence on the amount of pressure applied to the opposing surfaces of the glass sheet during the shaping operation thus decreasing the tendency of the flexible covers to imprint the sheet surfaces.

A specific embodiment of the invention has been described for purposes of illustration. Many modifications and variations will be apparent to those skilled in the art within the scope of the appended claims.

I claim:

1. Apparatus for press bending heat softened glass sheets comprising a pair of press bending blocks defining complementary concave and convex shaping surfaces of predetermined contour conforming to the shape desired for the glass sheet after bending, means to bring said press bending blocks into pressurized contact with opposing major surfaces of the heat softened glass sheet supported therebetween to shape said glass, at least one of said shaping surfaces having a flexible heat resistant covering to assist in preventing damaging of the glass surfaces by preventing direct contact of the glass with said shaping surfaces, means defining a ledge extending along the marginal edges of one of the shaping surfaces having the flexible covering such that the ledge is spaced outwardly of the edges of the shaped glass sheet when the latter is in contact with said shaping surface, and means securing and tensioning said flexible cover such that it extends over said ledge with the ledge tending to hold the cover portions adjacent thereto in spaced relation to the shaping surface portions underlying same, said ledge defining means causing the portions of the flexible cover adjacent thereto to resiliently urge glass in contact with same away from the shaping surface of said one press block after the glass has been released from said pressurized contact between said press bending blocks whereby to reduce any tendency of the shaped glass to cling to said last mentioned shaping surface.

2. Apparatus according to claim 1 wherein said ledge extends a substantial portion of the distance around said shaping surface.

3. Apparatus according to claim 1 wherein said ledge is associated with that press block having the convex shaping surface.

4. Apparatus according to claim 1 wherein said ledge extends above the shaping surface a distance slightly greater than the glass thickness and is adapted to contact the other shaping member during the glass bending operation to limit the contact pressure between the glass and shaping surfaces whereby to reduce the tendency of the flexible cover to imprint the glass surface.

5. Apparatus according to claim 1 wherein said ledge extends above the shaping surface a distance which is from about 0.010 inch to about 0.030 inch greater than the glass thickness and is adapted to contact the other shaping member during the glass bending operation to limit the contact pressure between the glass and shaping surfaces whereby to reduce the tendency of the flexible cover to imprint the glass surface.

6. Apparatus for press bending heat softened glass sheets comprising a pair of press bending blocks defining complementary concave and convex shaping surfaces of predetermined contour conforming to the shape desired for the glass sheet after bending, a flexible cover for at least one of said blocks, means to bring said press bending blocks into pressurized contact with opposing major surfaces of the heat softened glass sheet supported therebetween to shape said glass, and a ledge extending along the marginal edges of the shaping surface of one of said press blocks such that said ledge is spaced outwardly of the edges of the shaped glass sheet when the latter is in contact with said shaping surface, said ledge extending above the shaping surface a distance slightly greater than the glass thickness and being adapted to contact the other shaping member during the glass bending operation to limit the contact pressure between the glass and shaping surfaces whereby to reduce the tendency of the flexible cover to imprint the glass surface.

7. Apparatus according to claim 6 wherein said ledge extends above the shaping surface a distance which is about 0.010 inch to about 0.030 inch greater than the glass thickness.

8. The apparatus of claim 6 wherein said one shaping surface is the convex surface.

* * * * *